US006542875B1

(12) United States Patent
Mulvihill et al.

(10) Patent No.: US 6,542,875 B1
(45) Date of Patent: Apr. 1, 2003

(54) CHARITABLE AND PUBLIC FUNDING USING TAX CREDITS AND PASSIVE LOSSES

(75) Inventors: Steven Mulvihill, Elmhurst, IL (US); Patricia A. Teplan, Itasca, IL (US); Geraldine K. Ryan, Chicago, IL (US); John M. Ryan, Littleton, CO (US)

(73) Assignee: Arcon Capital, LLC, Lombard, IL (US)

( * ) Notice: Subject to any disclaimer, the term of this patent is extended or adjusted under 35 U.S.C. 154(b) by 0 days.

(21) Appl. No.: 09/377,574

(22) Filed: Aug. 19, 1999

Related U.S. Application Data

(60) Provisional application No. 60/097,407, filed on Aug. 21, 1998.

(51) Int. Cl.[7] .............................................. G06F 17/60
(52) U.S. Cl. ............................ 705/35; 705/30; 705/39
(58) Field of Search ................................ 705/30, 35, 39

(56) References Cited

U.S. PATENT DOCUMENTS

| | | | | | |
|---|---|---|---|---|---|
| 4,346,442 A | * | 8/1982 | Musmanno | .................. | 283/58 |
| 5,239,462 A | * | 8/1993 | Jones et al. | .................. | 358/400 |
| 5,644,721 A | * | 7/1997 | Chung et al. | .................. | 705/5 |
| 5,689,650 A | * | 11/1997 | McClellan et al. | ........... | 705/36 |
| 5,715,402 A | * | 2/1998 | Popolo | ........................ | 705/37 |

FOREIGN PATENT DOCUMENTS

WO          97/46985    * 12/1997    ............. G06F/7/06

OTHER PUBLICATIONS

Newman et al. Legislative Alert, Caritable Sector Letter, vol. II, No. 1, 1994.*

* cited by examiner

Primary Examiner—Vincent Millin
Assistant Examiner—Jagdish N Patel
(74) Attorney, Agent, or Firm—Chapman and Cutler

(57) ABSTRACT

Limited partnerships formed for specified public purposes, such as qualified low-income and elderly housing construction and services, are federally tax advantaged. In accordance with the present invention, tax credits and/or passive losses are leveraged by being directed into a method of funding charitable works, for instance school construction projects. A $1 million investment in a qualifying tax credit and/or passive loss plan, with recoupment of the investment after 13 years, will return 8.05% after taxes over 13 years if 50% of the tax credit amounts are donated to a qualified charity or public entity; this results in a net benefit to the donor of $1,759,450 and a total contribution to the charitable entity of $615,000. That contribution can, in accordance with the invention, fund the issuance and retirement of municipal bonds secured principally by the contribution, sufficient for a school construction project of about $500, 000.

10 Claims, 3 Drawing Sheets

Invest funds and give 50% tax credit to charity

| Year | Principal Invested | Tax Credit Earned | Charitable Deduction Net | Passive Loss | After-tax Passive Loss | After-Tax Cash Flow | Principal Returned* |
|---|---|---|---|---|---|---|---|
| 1 | $1,000,000 | $20,000 | $4,300 | $80,000 | $34,400 | $48,700 | |
| 2 | | $60,000 | $12,900 | $80,000 | $34,400 | $77,300 | |
| 3 | | $120,000 | $25,800 | $80,000 | $34,400 | $120,200 | |
| 4 | | $120,000 | $25,800 | $80,000 | $34,400 | $120,200 | |
| 5 | | $120,000 | $25,800 | $80,000 | $34,400 | $120,200 | |
| 6 | | $120,000 | $25,800 | $80,000 | $34,400 | $120,200 | |
| 7 | | $120,000 | $25,800 | $80,000 | $34,400 | $120,200 | |
| 8 | | $120,000 | $25,800 | $80,000 | $34,400 | $120,200 | |
| 9 | | $120,000 | $25,800 | $80,000 | $34,400 | $120,200 | |
| 10 | | $120,000 | $25,800 | $80,000 | $34,400 | $120,200 | |
| 11 | | $120,000 | $25,800 | $80,000 | $34,400 | $120,200 | |
| 12 | | $70,000 | $15,050 | | | $50,050 | $1,000,000 |
| 13 | | $0 | $0 | $0 | $0 | $0 | |
| TOTALS | $1,000,000 | $1,230,000 | $264,450 | $880,000 | $378,400 | $1,257,850 | $1,000,000 |

Total Money Returned: $2,759,450
Total Invested: $1,000,000
Net Benefits: $1,759,450
Pre-Tax Avg. Rate of Return: 12.01%
After-Tax Avg. Rate of Return: 8.05%
Total Given to Charity: $615,000
Actual Cost to Corporation: $350,550

FIG. 2

CHARITABLE AND PUBLIC FUNDING USING TAX CREDITS AND PASSIVE LOSSES

This application claims the benefit of U.S. Provisional Application No. 60/097,407, filed Aug. 21, 1998.

FIELD OF THE INVENTION

The present invention relates to methods using computer software assessment, monitoring, and documentation to carry out complex financial transactions.

BACKGROUND OF THE ART

Many computer systems are known for use in assisting in the evaluation, establishment, and monitoring and reporting on complex financial transactions. The original Cash Management System, for assessing levels of funds in various accounts and sweeping balances to maintain desired levels of cash in different investment pools, is set forth in U.S. Pat. No. 4,346,442. More recent patents on methods of carrying out complex financial transactions are U.S. Pat. No. 5,715,402, for a method and system for matching sellers and buyers of "spot metals"; U.S. Pat. No. 5,644,721, for a multiple currency travel reservation information management system and method; and U.S. Pat. No. 5,239,462, for a method and apparatus for automatically determining the approval status of a potential borrower. No art is known that pertains to assessment or administration of tax credits and/or passive losses or to redirection of same to charitable or public purposes for mutual benefit of the public, an investor, and a charity or public entity.

SUMMARY OF THE INVENTION

The object of the present invention is to provide a method for facilitating the funding of local public works and other charitable and public endeavors using the established benefits of tax credits and/or passive losses flowing from partnership products such as low income and elderly housing facilities. Through application of the present invention, a company's investment in a limited partnership is linked with a need of a charity or public entity such as a school district, and monetary benefits are provided to the company as return on its investment as well as to the charity and the public interest.

According to the invention, a need of an entity such as a capital need of a public school district is identified and prioritized, preferably through a computer listing and ranking of such needs. If the top priority projects include capital needs for which municipal bonds may be issued, the cash flow needs for servicing and retiring the bonds are assessed and computed. A supportive corporation, likely in the locality, is identified and asked to invest in a limited partnership which throws off passive losses and tax credits usable by the corporation; the amount of investment required is computed based on the cash flow required for the need and any bond servicing to be applied. The corporation makes the investment, in one payment or a series of payments, and the tax losses and credits begin to accrue. At specified times the corporation pays a portion, normally half, of the amount of the annual tax credit and/or passive loss that it receives, over to the charity or public entity to meet the need or bond servicing identified and linked to the transaction. After years of such credits, normally about 10, the need is met or the bonds retired, and the credits stop according to the limited partnership agreement. The limited partnership interest is then liquidated and part or all of the remaining capital investment is returned to the corporation or rolled over into a new investment.

The investing corporation benefits from the tax credits and the passive losses, donates for instance half of the dollar value of the tax credits and/or passive losses to the charity or public entity and takes tax deductions against its regular income therefor, receives an adequate after-tax return on its investment, and is hailed locally for its support of the worthy cause. The charity or public entity receives the money it needs without raising dues from its members or taxes on its citizens.

BRIEF DESCRIPTION OF THE DRAWINGS

FIG. 2 is a computer spreadsheet showing a typical financial projection calculation made for a $1 million investment and 50% of just the projected tax credit being donated to the charity or public entity, based on certain assumptions as stated.

THE PREFERRED EMBODIMENTS

Figure 1:
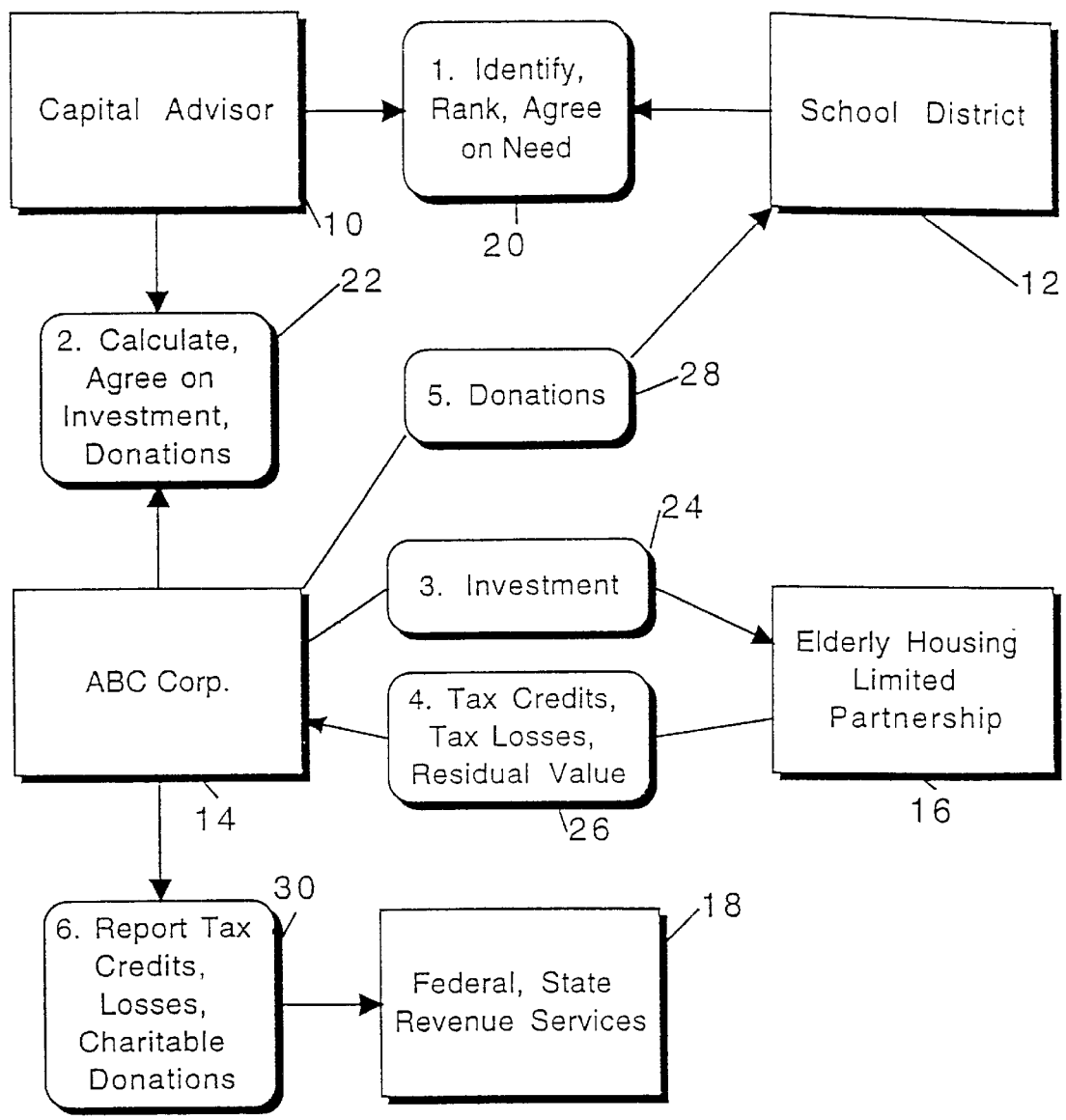
FIG. 1 is a flow chart showing one form of implementation of the method of the invention, using a capital advisor to a school district.

In one form of the invention, as shown in FIG. 1, using a capital adviser 10 to facilitate the transaction, a need or series of needs of a charity or public entity such as a school district 12 are identified, ranked, and agreed upon in a first step 209. This step should use available computer technology to maintain a record of each of the needs, past monies spent on it, architectural and other professional assessments of the nature and extent of the need and how to address it, prognoses of how the need could be met and what would happen if not it is met in the coming time frame, and the like. For instance, if a school has leaks in its roof, the history of the installation and past repairs of the roof should be examined in this step 20, together with assessments of what should be done to resolve the problem short-term and long-term obtained, the costs of alternative plans estimated, what other projects might be done in conjunction with such a roofing project or a smaller or larger one (i.e., install air conditioning, roofing vents, skylights, etc.). Needs for repaying parking facilities, for additional classrooms, gymnasium facilities, and the like should be similarly assessed in this step 20. Then, a ranking of each need in comparison to other needs identified is conducted, and which of the needs can be met from current resources or from application of the method of the present invention assessed by the school district 12 in cooperation with the capital advisor 10.

As the needs are assessed as at step 20, the capital advisor 10 will be calculating through available computer programs as at 22 the amount of investment required into a limited partnership to meet those needs. Generally a qualified limited partnership will provide both passive tax losses to an investor and also tax credits based on complex calculations permitted in the federal and state tax codes and regulations. For instance a $1 million investment can provide tax credits of $120,000 per year in each of the third through 11th years, with smaller credits in the first, second, and 12th years, depending on actual building and leasing of properties to qualified tenants. That investment also can provide passive losses, which offset regular net income, of $80,000 in each of the first to 10th years. Such limited partnership investments are available for instance through Boston Capital Services, Inc., of Boston, Mass. (www.BostonCapital.com), through its Tax Credit Fund IV L.P., as set forth in its prospectus for instance of Aug. 1, 1997, and an accompanying flyer, "Tax Credits Add Power to Your Portfolio".

The capital advisor 10 also, in step 22, identifies qualified individuals and corporations such as "ABC Corporation" 14 which may have an interest in helping the school district 12 to meet one or more of its needs as identified and ranked in step 20. Once the corporation 14, for instance, has committed to making an investment to generate tax credits and/or passive losses and to make corresponding donations to help the school district 12, the capital advisor reaches final, written, and enforceable agreements with both the school district 12 and the corporation 14 on the need(s) to be met and the dollar amounts of investments and donations to be made over the course of the transaction. Those agreements should put the investment risk onto the corporation to the extent feasible, as the charity or public entity 12 still bears the risk that the corporation may default on its contractual obligation.

Once the agreements 20 and 22 are in place between the corporation 14 and the charity or public entity 12, with the capital advisor 10 as broker or dealer, the corporation makes its investment as a third step, at 24, in a limited partnership such as an elderly housing project. The Boston Capital Tax Credit Fund IV L.P. offers a suitable investment vehicle, subject to the risks stated therein. Tax credits and usually also passive investment tax losses then flow back from the limited partnership to the corporation in a fourth step, as at 26. The corporation then makes the agreed donations each year in a fifth step, at 28, to the school district 12 or other charity or public entity.

The amount of the donation 28 each year made by the corporation to the school district during the term of the agreement will normally be stated as a part or percentage of the tax credit and/or passive loss as projected to be received by the corporation from the investment; in this way the corporation rather than the charity or public entity bears the risk of the investment not achieving its goals in whole or in part. The percentage which the donation bears to the projected tax credit and/or passive loss affects, of course, the return on the "investment" as seen by the corporation. Where the investment is made with no donation, an after-tax rate of return of nearly a handsome 11% is seen, counting passive tax losses and assuming return of all principal at the end of the 13 year term of the deal. If all of the projected tax credit (but none of the passive loss) is to be donated, the after-tax rate of return on these same assumptions is relatively paltry, just under 5%. A donation of 50% of the projected tax credit (but none of the passive loss benefit) results in a very suitable after-tax projected rate of return of 8.05%, again using the stated assumptions. This latter, preferred calculation is shown for analysis purposes in a computer-generated spreadsheet in FIG. 2. Where a portion of the passive loss benefit is also donated, for instance in the first and second years (when tax credits are low) the return will fall a bit but still be acceptable.

Once the investment and each annual donation are made, the corporation 14 will report its tax transactions in a sixth step 30 to the appropriate federal and state authorities 18. At this time the tax credits, passive losses, and charitable donations are taken advantage of and the benefits to the corporation are realized. Federal tax credits are guaranteed for any particular housing program upon its qualification for Federal Housing Tax Credits as established in the federal tax law; state tax benefits are also available.

Figure 3:
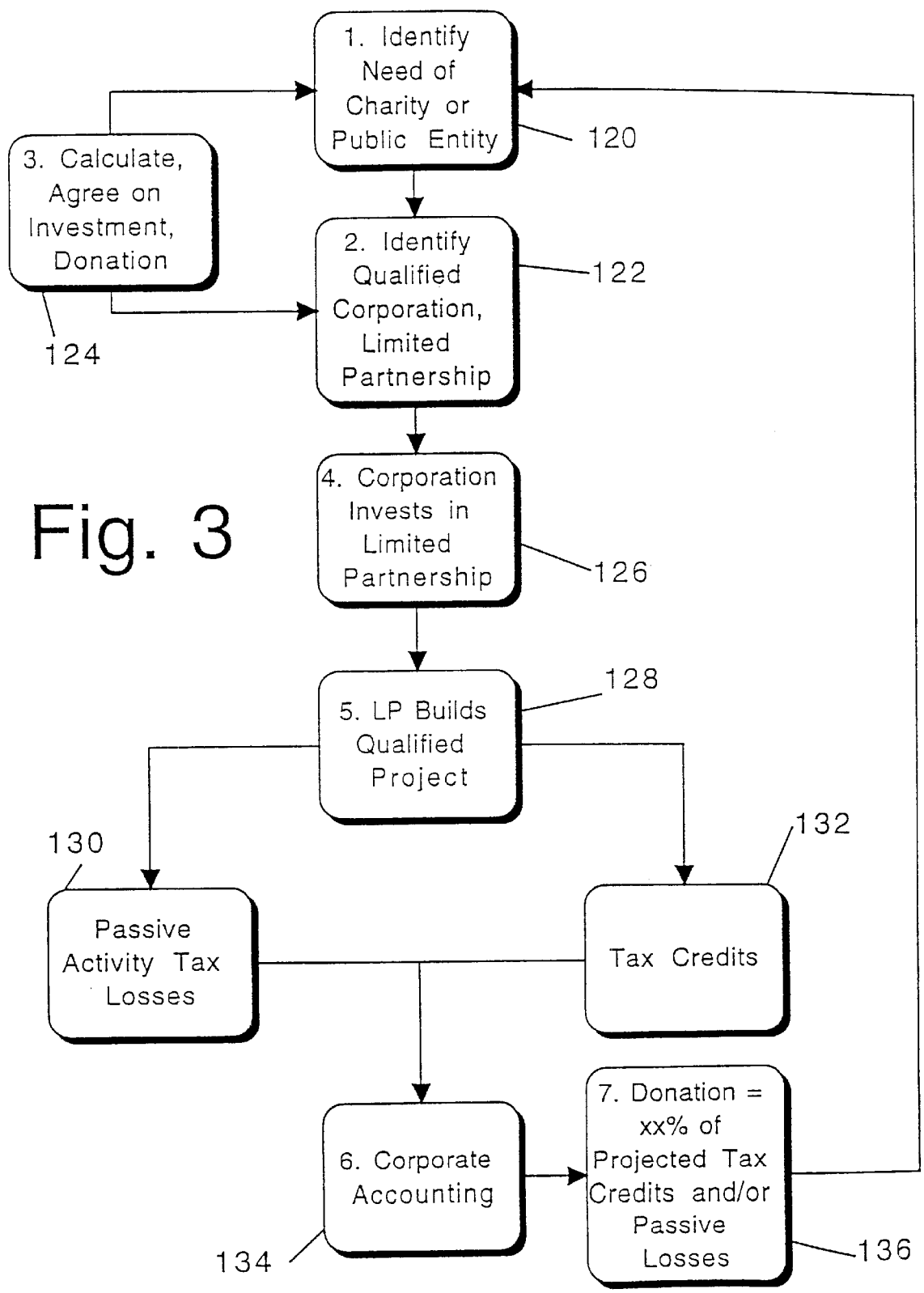
FIG. 3 is a flow chart showing a more general form of implementation of the method of the invention.

FIG. 3 shows the invention in its more general aspects. A need of a charity or other public entity is identified at 120, by the entity, by an outside advisor, by a philanthropic on-looker, or otherwise; if several needs exist, one or more are so identified and selected as object(s) of funding. A qualified corporation and a qualified limited partnership offering tax credits are identified in step 122. The amount of the donation sufficient to meet the need 120, and the investment required to fund that donation through a portion of the tax credit and/or passive loss thrown off by the limited partnership are calculated, most easily in a suitable computer program, as at 124. Then an enforceable agreement is struck among the corporation, the charity or public entity, and the limited partnership, also at 124, which will provide tax benefits to the corporation, funding to the partnership for public-benefit works, and donations to the charity to meet its need.

Then the corporation makes its investment in the limited partnership, in step 4 at 126, in the amount agreed. The partnership builds and leases its qualified project, as in step 5 at 128, and throws off passive activity losses 130 and tax credits 132. Those losses and credits are computed in the corporation's accounting section, at 134, and donations as an agreed percentage, usually between 40 and 60% and often at 50%, of the projected tax credits and/or passive losses are made to meet the need of the charity or public entity, in a 7th step at 136. This step 136 may alternatively occur as the investment is made, at 126, not just after the project is built and operating, in which case the amount of the donation will also be transmitted to the accounting department for use in tax computations and payments. A public entity may need standby approval for tax increases in case of any default on the annual payment obligation by the corporation.

Where the need identified at 20 or 120 is a capital project, such as a building project or repair project for a school, bonds may be issued to capitalize the income stream 28 or 136 guaranteed by the corporation from the percentage of the tax credit and/or passive loss flow projected. Thus a total commitment of $615,000 over twelve years, as in FIG. 3, will fund municipal bonds with a face value of about $500,000. Such bonds, secured by the corporation's pledge to make the annual donations as well as by back-up taxing authority of the public entity, should not raise tax rates in the municipality or district.

Many variations may be made in the invention shown and its manner of practice without departing from the principles of the invention as pictured and described herein and claimed as our invention. The invention resides broadly in the use of the disclosed tax credit and/or passive loss financing system, based in and assisted by computer calculations and assessments, as disclosed above and as recited in the claims. Minor variations in approach and method will not avoid the use of the invention.

We claim as our invention:

1. A method of assessing and effecting the transfer of qualified tax credit and/or passive loss monies earned by a corporation to a qualified chantable or public entity recipient, comprising the steps:

identifying a need for funding to a recipient which is tax-qualified as a charity or a public entity;

calculating the returns available to said corporation by its investing in a qualified limited partnership which generates tax credits and/or passive losses for said partnership and for said investing corporation;

calculating the portion of the tax credits and/or passive losses which may be donated to the recipient while maintaining an acceptable level of return on said investment to said corporation;

documenting enforceable agreements entered into between the corporation and the limited partnership and between the corporation and the recipient for effecting the transfer of qualified tax credit and/or passive loss monies earned by the corporation to the qualified charitable or public entity recipient; and at least partly carrying out said agreements.

2. The method of claim 1, wherein the carrying out of the agreements is assessed and documented at least about annually.

3. The method of claim 1, wherein the need identified is one for which municipal bonds may be issued and wherein the bonds are backed at least in part by said enforceable agreements.

4. The method of claim 1, wherein about 40% to about 60% of said tax credit and/or passive loss amounts as projected are donated to the recipient.

5. The method of claim 1, wherein about 50% of said tax credit and/or passive loss amounts as projected are donated to the recipient.

6. A method of funding a selected need of a public entity or charity, comprising the steps:

assessing what dollar amount is sufficient to satisfy said need;

identifying a qualified limited partnership opportunity for investment by a corporation for generating a dollar value of tax credits and/or passive losses in each of a number of years;

computing the amount of investment required by said corporation for meeting said need through donation of a portion of said dollar value of said tax credits and/or passive losses;

arranging the amount of said investment and said donation portion to provide an acceptable financial return to the corporation on said investment;

documenting an enforceable agreement for funding the selected need of the public entity or charity, among the corporation, the partnership, and the public entity or charity; and at least partly carrying out the agreement.

7. The method of claim 6, further comprising the step of annualizing said need over a period of years.

8. The method of claim 7, further comprising the step of issuing bonds, secured by said enforceable agreement, for meeting said need promptly while retiring the bonds over time with said donations.

9. The method of claim 6, wherein the donation is about 50% of the dollar value of the tax credit and/or the passive loss in each year.

10. The method of claim 6, wherein the need identified is a public school capital repair project.

\* \* \* \* \*